US012122371B2

United States Patent
Kozono et al.

(10) Patent No.: US 12,122,371 B2
(45) Date of Patent: Oct. 22, 2024

(54) DRIVING ASSISTANCE DEVICE FOR VEHICLE

(71) Applicant: SUBARU CORPORATION, Tokyo (JP)

(72) Inventors: Kazuya Kozono, Tokyo (JP); Shinji Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 302 days.

(21) Appl. No.: 17/850,230

(22) Filed: Jun. 27, 2022

(65) Prior Publication Data

US 2023/0008744 A1    Jan. 12, 2023

(30) Foreign Application Priority Data

Jul. 7, 2021    (JP) .................................. 2021-113034

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 30/18159; B60W 40/04; B60W 2420/408; B60W 2420/54; B60W 2554/4045; B60W 2554/4046; B60W 2554/60; B60W 2556/40; B60W 2552/10;
(Continued)

(56) References Cited

U.S. PATENT DOCUMENTS 5,684,473 A * 11/1997 Hibino ............... B60K 31/0008
340/904
5,710,565 A *  1/1998 Shirai ...................... B62D 1/28
342/72

(Continued)

FOREIGN PATENT DOCUMENTS

JP    2019-032712 A    2/2019

*Primary Examiner* — Mussa A Shaawat
(74) *Attorney, Agent, or Firm* — Rimon P.C.

(57) ABSTRACT

Traveling environment information is recognized. A predicted traveling path is calculated based on a driving condition of a vehicle. An oncoming-vehicle predicted traveling path is calculated based on behavior of an oncoming vehicle. It is determined whether the vehicle has an intention to enter a first intersecting road at an intersection. When the vehicle cannot enter the first intersecting road, the predicted traveling path is corrected to a limit traveling path. It is determined whether the oncoming vehicle has an intention to enter a second intersecting road at the intersection. When the oncoming vehicle cannot enter the second intersecting road, the oncoming-vehicle predicted traveling path is corrected to an oncoming-vehicle limit traveling path. The oncoming vehicle is set as a control target against which emergency braking is executed when the predicted traveling path and the oncoming-vehicle predicted traveling path overlap each other at least in part.

17 Claims, 12 Drawing Sheets

(51) Int. Cl.
*B60W 30/095* (2012.01)
*B60W 30/18* (2012.01)
*B60W 40/04* (2006.01)
*G06V 20/58* (2022.01)

(52) U.S. Cl.
CPC ...... *B60W 30/18159* (2020.02); *B60W 40/04* (2013.01); *G06V 20/584* (2022.01); *B60W 2420/403* (2013.01); *B60W 2420/408* (2024.01); *B60W 2420/54* (2013.01); *B60W 2554/4045* (2020.02); *B60W 2554/4046* (2020.02); *B60W 2554/60* (2020.02); *B60W 2556/40* (2020.02)

(58) Field of Classification Search
CPC ....... B60W 30/0953; B60W 30/18145; B60W 30/18154; B60W 30/18109; G06V 20/584; G06V 20/58; G06V 20/56
See application file for complete search history.

(56) References Cited

U.S. PATENT DOCUMENTS

| | | | | |
|---|---|---|---|---|
| 5,751,211 A * | 5/1998 | Shirai | ................... | B60W 30/18 340/904 |
| 5,754,099 A * | 5/1998 | Nishimura | ................ | B60T 7/22 342/70 |
| 5,798,727 A * | 8/1998 | Shirai | ................... | G01S 13/931 342/107 |
| 5,818,355 A * | 10/1998 | Shirai | ................... | B60K 28/10 340/904 |
| 5,864,391 A * | 1/1999 | Hosokawa | .............. | G01S 17/04 356/5.01 |
| 6,265,990 B1 * | 7/2001 | Isogai | ................... | G08G 1/167 340/436 |
| 8,670,915 B2 * | 3/2014 | Kuge | ................... | B60W 50/16 701/301 |
| 9,098,080 B2 * | 8/2015 | Norris | ............... | B60W 60/0053 |
| 11,017,513 B1 * | 5/2021 | Yarlagadda | ........... | G06F 18/256 |
| 11,087,146 B2 * | 8/2021 | Watanabe | ............ | G06V 20/588 |
| 11,142,198 B2 * | 10/2021 | Watanabe | ............ | G06V 20/584 |
| 11,267,464 B2 * | 3/2022 | Luo | ........................ | G08G 1/165 |
| 11,361,199 B2 * | 6/2022 | Mizoguchi | ........... | G01S 13/931 |
| 11,400,918 B2 * | 8/2022 | Horiguchi | ............ | G05D 1/0223 |
| 11,407,417 B2 * | 8/2022 | Mizoguchi | .......... | B60W 30/146 |
| 11,468,772 B2 * | 10/2022 | Mizoguchi | ............ | G06V 20/56 |
| 11,628,864 B2 * | 4/2023 | Mizoguchi | ............. | G01C 21/32 701/25 |
| 11,993,292 B2 * | 5/2024 | Namba | ............ | B60W 60/0059 |
| 2007/0198189 A1 * | 8/2007 | Herbin | ................... | G08G 1/166 701/300 |
| 2008/0136612 A1 * | 6/2008 | Machii | ................... | G01S 17/931 340/435 |
| 2008/0169966 A1 * | 7/2008 | Tsuchihashi | .......... | G01S 7/2922 342/70 |
| 2012/0221209 A1 * | 8/2012 | Tatsukawa | .......... | B60W 10/184 701/42 |
| 2015/0266473 A1 * | 9/2015 | Hayasaka | ............. | B60W 30/09 701/70 |
| 2015/0321555 A1 * | 11/2015 | Fukata | .................. | B60W 50/12 701/70 |
| 2016/0137197 A1 * | 5/2016 | Hayakawa | ...... | B60W 30/18154 701/70 |
| 2017/0001642 A1 * | 1/2017 | Kumai | .................. | B60W 30/16 |
| 2017/0098131 A1 * | 4/2017 | Shashua | ................ | G06V 20/58 |
| 2017/0358102 A1 * | 12/2017 | Akiyama | .................. | G06T 7/20 |
| 2018/0164812 A1 * | 6/2018 | Oh | .......................... | G06N 3/02 |
| 2018/0260634 A1 * | 9/2018 | Kim | ..................... | G06F 18/217 |
| 2018/0293466 A1 * | 10/2018 | Viswanathan | ...... | G01C 21/3602 |
| 2019/0225219 A1 * | 7/2019 | Ueda | ..................... | B60W 10/20 |
| 2019/0251372 A1 * | 8/2019 | Dwivedi | .............. | G06V 20/588 |
| 2019/0279004 A1 * | 9/2019 | Kwon | ....................... | G06N 3/08 |
| 2019/0294889 A1 * | 9/2019 | Sriram | ...................... | G06T 7/70 |
| 2020/0349378 A1 * | 11/2020 | Raghoebardajal | .......................... G02B 27/0172 |
| 2021/0006713 A1 * | 1/2021 | Iino | .......................... | B60R 1/27 |
| 2021/0387621 A1 * | 12/2021 | Takano | ............... | B60W 30/165 |

* cited by examiner

DRIVING ASSISTANCE DEVICE FOR VEHICLE

CROSS-REFERENCE TO RELATED APPLICATIONS

The present application claims priority from Japanese Patent Application No. 2021-113034 filed on Jul. 7, 2021, the entire contents of which are hereby incorporated by reference.

BACKGROUND

The disclosure relates to a driving assistance device that can perform braking control for a vehicle against an obstacle such as a preceding vehicle or an oncoming vehicle.

In the field of vehicles such as automobiles, driving assistance devices that assist driving operations of drivers have been put into practical use to reduce loads on the driving operations of the drivers and improve safety. In this type of driving assistance device, driving modes include, for example, a manual driving mode in which steering, acceleration, and deceleration are performed in response to a voluntary driving operation of a driver, a driving assistance mode in which steering assistance control and acceleration/deceleration control are performed under the precondition that the driver voluntarily performs the driving operation, and a driving assistance mode in which the vehicle travels without the driving operation of the driver (so-called autonomous driving mode).

The driving assistance control in each driving assistance mode is basically achieved by an adaptive cruise control (ACC) function and an active lane keep centering (ALKC) function. With this driving assistance control, the vehicle can automatically travel along a traveling lane while keeping a distance from a preceding vehicle.

As a technology related to active safety of the driving assistance device, the following technology is put into practical use. When an obstacle such as a preceding vehicle or a stopped vehicle is recognized ahead of a vehicle so that an emergency stop is expected, autonomous emergency braking (AEB: collision damage reduction braking) control is performed against the obstacle as interrupt control to perform deceleration so that the relative speed between the vehicle and the obstacle reaches zero. The control target against which the emergency braking is executed is not limited to the preceding vehicle and the stopped vehicle ahead in the vehicle traveling road but may also include an oncoming vehicle having a high risk of collision with the vehicle in an intersection.

For example, Japanese Unexamined Patent Application Publication (JP-A) No. 2019-32712 discloses a technology of predicting a traveling trajectory along which a moving object is expected to travel in an intersection (calculating a predicted traveling path) based on speed information related to a moving speed of the moving object and intersection information including a shape of the intersection, and determining a traveling risk of a determination position where the predicted trajectory intersects an oncoming lane. JP-A No. 2019-32712 also discloses a technology of automatically braking or stopping a vehicle in addition to output of an alert when determination is made that the traveling risk is present.

SUMMARY

An aspect of the disclosure provides a driving assistance device for a vehicle. The driving assistance device includes a traveling environment recognizer, a predicted traveling path calculator, an oncoming-vehicle predicted traveling path calculator, a turning intention determiner, a predicted traveling path corrector, an oncoming-vehicle turning intention determiner, an oncoming-vehicle predicted traveling path corrector, and a control target setter. The traveling environment recognizer is configured to recognize traveling environment information related to an outside of the vehicle. The predicted traveling path calculator is configured to calculate a predicted traveling path for the vehicle based on a driving condition of the vehicle. The oncoming-vehicle predicted traveling path calculator is configured to, in a case where an oncoming vehicle is detected based on the traveling environment information, calculate an oncoming-vehicle predicted traveling path for the oncoming vehicle based on behavior of the oncoming vehicle. The turning intention determiner is configured to determine whether the vehicle has an intention to enter a first intersecting road across an oncoming lane by turning in an intersection. The predicted traveling path corrector is configured to, in a case where the vehicle has the intention to enter the first intersecting road but is unable to enter the first intersecting road along the predicted traveling path, correct the predicted traveling path to a limit traveling path for causing the vehicle to enter the first intersecting road. The oncoming-vehicle turning intention determiner is configured to determine whether the oncoming vehicle has an intention to enter a second intersecting road across a traveling lane for the vehicle by turning in the intersection. The oncoming-vehicle predicted traveling path corrector is configured to, in a case where the oncoming vehicle has the intention to enter the second intersecting road but is unable to enter the second intersecting road along the oncoming-vehicle predicted traveling path, correct the oncoming-vehicle predicted traveling path to an oncoming-vehicle limit traveling path for causing the oncoming vehicle to reach the second intersecting road. The control target setter is configured to set the oncoming vehicle as a control target against which emergency braking is executed in a case where the predicted traveling path up to a preset timing and the oncoming-vehicle predicted traveling path up to the preset timing are expected to overlap each other at least in part.

An aspect of the disclosure provides a driving assistance device for a vehicle. The driving assistance device includes circuitry. The circuitry is configured to recognize traveling environment information related to an outside of the vehicle. The circuitry is configured to calculate a predicted traveling path based on a driving condition of the vehicle. The circuitry is configured to, in a case where an oncoming vehicle is detected based on the traveling environment information, calculate an oncoming-vehicle predicted traveling path for the oncoming vehicle based on behavior of the oncoming vehicle. The circuitry is configured to determine whether the vehicle has an intention to enter a first intersecting road across an oncoming lane by turning in an intersection. The circuitry is configured to, in a case where the vehicle has the intention to enter the first intersecting road but is unable to enter the first intersecting road along the predicted traveling path, correct the predicted traveling path to a limit traveling path for causing the vehicle to enter the first intersecting road. The circuitry is configured to determine whether the oncoming vehicle has an intention to enter a second intersecting road across a traveling lane for the vehicle by turning in the intersection. The circuitry is configured to, in a case where the oncoming vehicle has the intention to enter the second intersecting road but is unable to enter the second intersecting road along the oncoming-vehicle predicted traveling path, correct the oncoming-vehicle predicted traveling path to an oncoming-vehicle limit traveling path for causing the oncoming vehicle to reach the second intersecting road. The circuitry is configured to set the oncoming vehicle as a control target against which emergency braking is executed in a case where the predicted traveling path up to a preset and the oncoming-vehicle predicted traveling path up to the preset timing are expected to overlap each other at least in part.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In a case where the traveling risk determination result disclosed in JP-A No. 2019-32712 is applied to emergency braking control, there is a possibility that inappropriate emergency braking is executed, for example, when an oncoming vehicle does not start to turn right until the oncoming vehicle reaches close proximity to a vehicle turning right in an intersection.

That is, the right-turn start timings of the vehicle and the oncoming vehicle in the intersection greatly differ depending on drivers. Some drivers do not start steering before reaching a point immediately behind a right-turn destination road. Even if both the vehicle and the oncoming vehicle turn right, there is a possibility that the emergency braking is executed with the oncoming vehicle determined as a straightforward vehicle depending on the timing to calculate a predicted traveling path of the oncoming vehicle in the right-turn direction.

It is desirable to provide a driving assistance device that can suppress execution of inappropriate emergency braking of a vehicle against an oncoming vehicle in an intersection.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
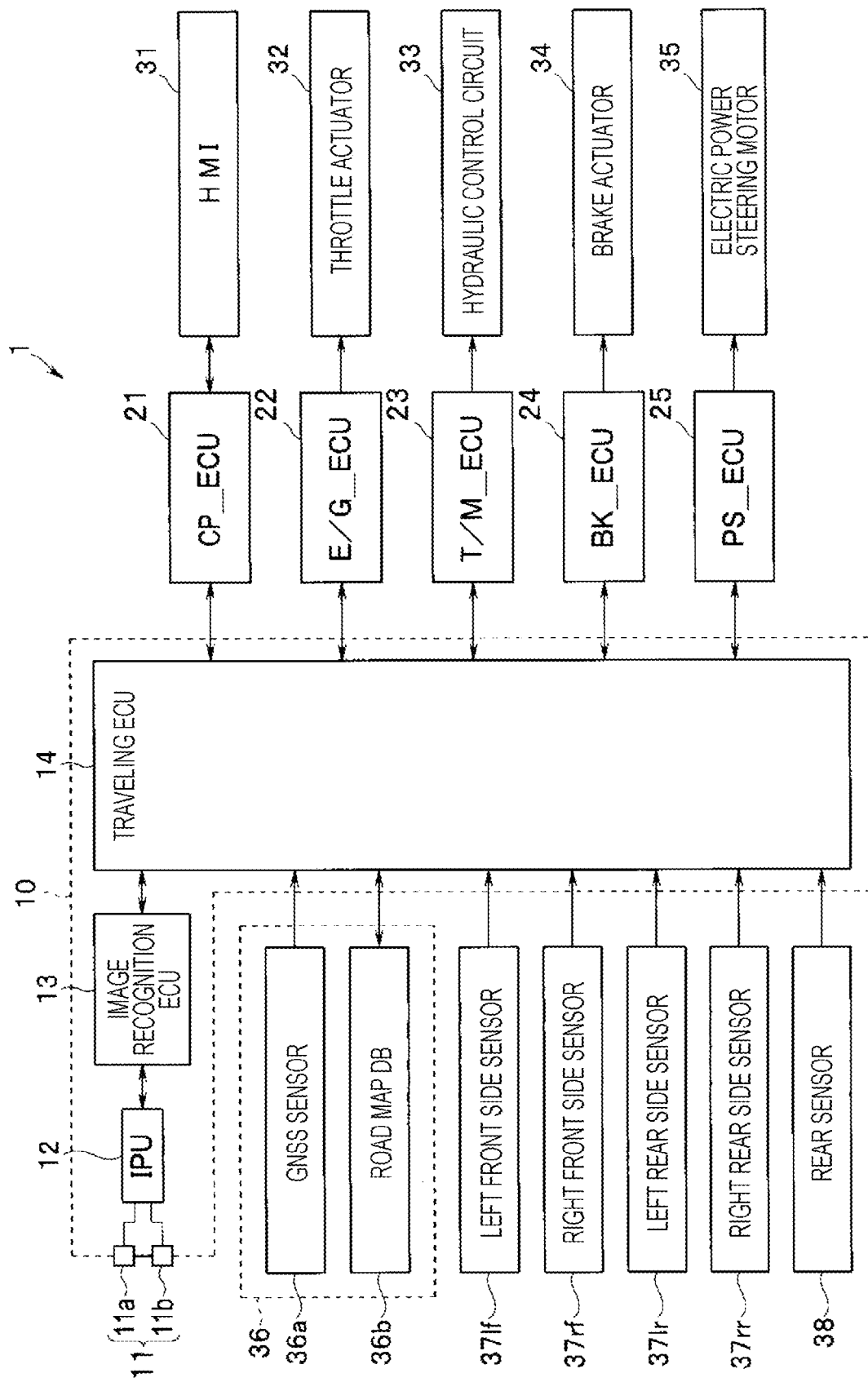
FIG. 1 is an overall configuration diagram of a driving assistance device.

FIG. 1 is an overall configuration diagram of a driving assistance device 1 according to the embodiment.

As illustrated in FIG. 1, a driving assistance device 1 includes, for example, a camera unit 10 fixed to an upper central part of a front area in a cabin of a vehicle M.

The camera unit 10 includes a stereo camera 11, an image processing unit (IPU) 12, an image recognition unit (image recognition ECU) 13, and a traveling control unit (traveling ECU) 14.

The stereo camera 11 includes a main camera 11a and a subcamera 11b. For example, the main camera 11a and the subcamera 11b are bilaterally symmetrical across the center in a vehicle width direction. For example, the main camera 11a and the subcamera 11b each include a CMOS, and perform stereoscopic imaging for a traveling environment in an external forward area Af (see FIG. 2) from different viewpoints in every predetermined synchronous imaging period.

The IPU 12 performs predetermined image processing for traveling environment images captured by the stereo camera 11 to detect various target edges of, for example, three-dimensional objects and lane lines on a road surface in the images. The IPU 12 obtains distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the vehicle M is traveling (traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on traveling environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a lateral positional deviation that is a distance from the lane center to the center of the vehicle M in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, and relative speeds Vrel between the three-dimensional objects and the vehicle M.

Various types of information recognized by the image recognition ECU 13 are output to the traveling ECU 14 as traveling environment information.

The image recognition ECU 13 recognizes traveling environment information related to the outside of the vehicle in cooperation with the stereo camera 11 and the IPU 12. In one embodiment, the image recognition ECU 13 may serve as a "traveling environment recognizer".

The traveling ECU 14 is a control unit that centrally controls the driving assistance device 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, a right front side sensor 37rf, a left front side sensor 37lf, a right rear side sensor 37rr, a left rear side sensor 37lr, and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of driving assistance control, a mode selection switch for switching driving assistance modes, a steering touch sensor that detects a steering wheel holding state of a driver, a driver monitoring system (DMS) that performs facial authentication of the driver and detects a line of sight, a touch panel display, a combination of meters, and a loudspeaker.

In response to a control signal from the traveling ECU 14, the CP_ECU 21 notifies the driver as appropriate by display and sound through the HMI 31 about various types of information related to, for example, various alerts for a preceding vehicle, the status of the driving assistance control, and the traveling environment of the vehicle M. The CP_ECU 21 outputs, to the traveling ECU 14, various types of information input by the driver through the HMI 31, such as ON/OFF operations on various types of driving assistance control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, either one of a control signal from the traveling ECU 14 and detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on either one of a control signal from the traveling ECU 14 and detection signals from various sensors. Thus, the BK_ECU 24 generates, for the wheels as appropriate, braking forces for forcible braking control and yaw rate control on the vehicle M. The BK_ECU 24 outputs, to the traveling ECU 14, signals of a brake operation status, a yaw rate, a longitudinal acceleration, a vehicle speed, and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on either one of a control signal from the traveling ECU 14 and detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the vehicle M by receiving positioning signals from a plurality of positioning satellites.

The road map DB 36b is a large-capacity storage medium such as an HDD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the vehicle position of the vehicle M measured by the GNSS sensor 36a to the traveling ECU 14 as traveling environment information.

The road map DB 36b recognizes traveling environment information related to the outside of the vehicle in cooperation with the GNSS sensor 36a. In one embodiment, the road map DB 36b may serve as a "traveling environment recognizer".

The locator unit 36 serves as a navigation device. That is, when the driver inputs a destination through the touch panel display or the like in the HMI 31, the locator unit 36 sets a target route from a current position to the destination. The set target route is output to the traveling ECU 14 and displayed on the display in the HMI 31 as appropriate.

Examples of the right front side sensor 37rf and the left front side sensor 37lf include millimeter wave radars. For example, the right front side sensor 37rf and the left front side sensor 37lf are disposed on right and left sides of a front bumper. The right front side sensor 37rf and the left front side sensor 37lf detect, as traveling environment information, three-dimensional objects in right and left obliquely forward and side areas Arf and Alf around the vehicle M (see FIG. 2). Those areas are difficult to recognize from an image captured by the stereo camera 11.

Examples of the right rear side sensor 37rr and the left rear side sensor 37lr include millimeter wave radars. For example, the right rear side sensor 37rr and the left rear side sensor 37lr are disposed on right and left sides of a rear bumper. The right rear side sensor 37rr and the left rear side sensor 37lr detect, as traveling environment information, three-dimensional objects in right and left obliquely rearward and side areas Arr and Alr around the vehicle M (see FIG. 2). Those areas are difficult to recognize by the right front side sensor 37rf and the left front side sensor 37lf.

Each millimeter wave radar detects the three-dimensional object such as a vehicle traveling side by side by outputting a radio wave and analyzing the reflected wave from the object. For example, each radar detects a width of the three-dimensional object, a position of a representative point of the three-dimensional object (position relative to the vehicle M), and a speed of the three-dimensional object as information related to the three-dimensional object.

The right front side sensor 37rf, the left front side sensor 37lf, the right rear side sensor 37rr, and the left rear side sensor 37lr recognize traveling environment information related to the outside of the vehicle M. In one embodiment, the right front side sensor 37rf, the left front side sensor 37lf, the right rear side sensor 37rr, and the left rear side sensor 37lr may serve as a "traveling environment recognizer".

Examples of the rear sensor 38 include a sonar. For example, the rear sensor 38 is disposed on the rear bumper. The rear sensor 38 detects three-dimensional objects in a rearward area Ar behind the vehicle M (see FIG. 2) as traveling environment information. This area is difficult to recognize by the right rear side sensor 37rr and the left rear side sensor 37lr.

The rear sensor 38 recognizes traveling environment information related to the outside of the vehicle M. In one embodiment, the rear sensor 38 may serve as a "traveling environment recognizer".

Figure 2:
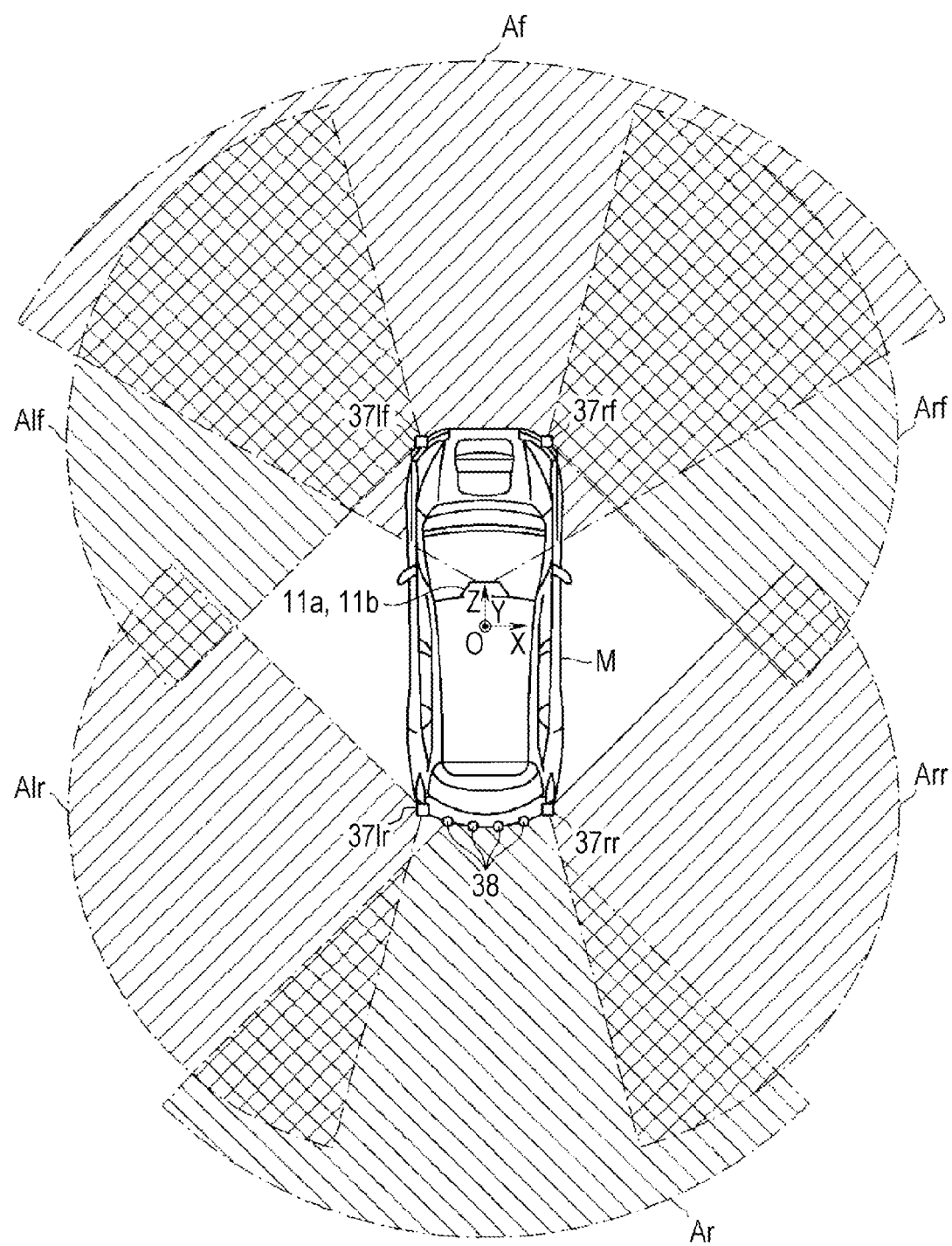
FIG. 2 is a diagram illustrating monitoring areas of a stereo camera, a radar, and a sonar.

Coordinates of the external targets in the traveling environment information recognized by the image recognition ECU 13, the traveling environment information recognized by the locator unit 36, the traveling environment information recognized by the right front side sensor 37rf, the traveling environment information recognized by the left front side sensor 37lf, the traveling environment information recognized by the right rear side sensor 37rr, the traveling environment information recognized by the left rear side sensor 37lr, and the traveling environment information recognized by the rear sensor 38 are converted by the traveling ECU 14 into coordinates in a three-dimensional coordinate system having its origin at the center of the vehicle M (see FIG. 2).

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the vehicle M travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode in which the vehicle M travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control is basically performed based on traveling environment information input from the image recognition ECU 13. For example, the adaptive cruise control is performed based on preceding vehicle information in the traveling environment information from the image recognition ECU 13.

The active lane keep centering control and the active lane keep bouncing control are basically performed based on traveling environment information input from at least one of the image recognition ECU 13 or the locator unit 36. For example, the active lane keep centering control and the active lane keep bouncing control are performed based on lane line information in the traveling environment information from either one of the image recognition ECU 13 and the locator unit 36.

The second traveling control mode is an autonomous driving mode in which the vehicle M travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the vehicle M is automatically stopped, for example, at a side strip when the vehicle M traveling in the second traveling control mode cannot continue the traveling in this mode and the driver cannot take over the driving operation (that is, the mode cannot be switched to either one of the manual driving mode and the first traveling control mode).

In each of the driving modes described above, the traveling ECU 14 performs autonomous emergency braking (AEB: collision damage reduction braking) control as appropriate against an obstacle such as a preceding vehicle traveling on the vehicle traveling road and having a strong possibility of colliding with the vehicle M.

For example, the traveling ECU 14 extracts, based on traveling environment information, a three-dimensional object such as a preceding vehicle L (see FIG. 5) or a stopped vehicle ahead of the vehicle M on the vehicle traveling road. In a case where an intersection is present on the traveling road, the traveling ECU 14 also extracts a three-dimensional object such as an oncoming vehicle O entering the intersection (see FIG. 6 to FIG. 12).

The traveling ECU 14 determines a possibility of collision between the vehicle M and each extracted three-dimensional object, and calculates a time-to-collision TTC(=(relative distance to control target)/(relative speed to control target)) of the three-dimensional object having a strong possibility of collision with the vehicle M.

Among the three-dimensional objects having the strong possibility of collision with the vehicle M, the traveling ECU 14 sets the three-dimensional object having the shortest time-to-collision TTC as a control target Trg (obstacle).

When the time-to-collision TTC is equal to or shorter than a preset first threshold Tth1, the traveling ECU 14 alerts the driver to avoid collision with the control target Trg. The alert may include alert braking (light braking) using a preset deceleration a1 in addition to an audio or visual alert.

When the driver does not perform any appropriate operation to avoid collision despite the alert and the time-to-collision TTC is equal to or shorter than a preset second threshold Tth2 (Tth2<Tth1), the traveling ECU 14 executes emergency braking (hard braking) of the vehicle M against the control target Trg by using a preset deceleration a2 (a2>a1).

The alert control and the emergency braking control are applied not only to, for example, the first traveling control mode and the second traveling control mode but also to the manual driving mode.

When setting the control target Trg, the traveling ECU 14 calculates predicted traveling paths of the vehicle M and each three-dimensional object up to a timing of elapse of a preset period N (for example, N=4 seconds).

For example, the traveling ECU 14 calculates the predicted traveling path of the vehicle M (predicted traveling path Cm) up to the timing of elapse of the set period N (see, for example, FIGS. 5, 6, 7, 9, and 11) based on driving conditions of the vehicle M (for example, a vehicle speed, a steering angle, and a yaw rate). In the figures, "M'" represents the vehicle M at the timing of elapse of the set period N.

For example, when any three-dimensional object is detected based on the traveling environment information, the traveling ECU 14 calculates the predicted traveling path of the three-dimensional object up to the timing of elapse of the set period N based on the behavior of the three-dimensional object (for example, a moving speed and a moving direction).

Figure 5:
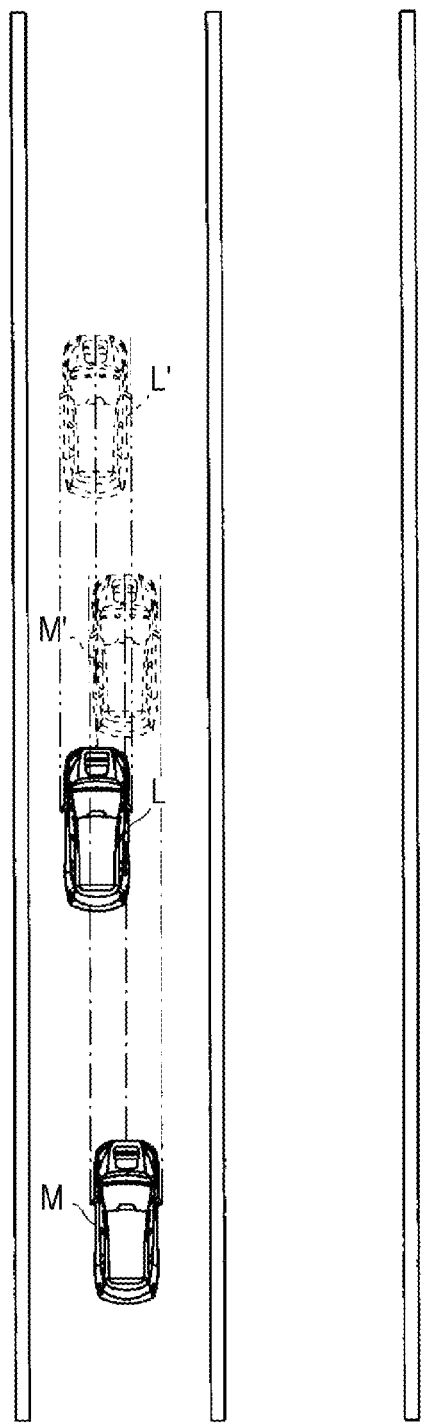
FIG. 5 is a diagram illustrating a predicted traveling path and a preceding-vehicle predicted traveling path.

FIG. 5 illustrates a predicted traveling path of the three-dimensional object that is the preceding vehicle L (preceding-vehicle predicted traveling path Cl). In the figure, "L'" represents the preceding vehicle at the timing of elapse of the set period N. FIGS. 6, 7, 9, and 11 illustrate a predicted traveling path of the three-dimensional object that is the oncoming vehicle O (oncoming-vehicle predicted traveling path Co). In the figures, "O'" represents the oncoming vehicle at the timing of elapse of the set period N.

Among the predicted traveling paths, the predicted traveling path Cm and the oncoming-vehicle predicted traveling path Co are corrected as appropriate in the intersection.

For example, when the vehicle M has entered the intersection, the traveling ECU 14 determines whether the vehicle M (driver of the vehicle M) has a right-turn intention in the intersection. That is, the traveling ECU 14 determines whether the vehicle M has an intention to turn (to the right) in the intersection to enter a right-turn destination road (first intersecting road) across an oncoming lane. The oncoming lane may include: a first oncoming lane where the oncoming vehicle O is travelling; a second oncoming lane where the oncoming vehicle O is to be travelled in a case where the oncoming vehicle O travels straight ahead from the first oncoming lane across the intersection; and a region of the intersection between the first oncoming lane and the second oncoming lane.

For example, the traveling ECU 14 determines that the vehicle M has the right-turn intention in the intersection in at least one of a case where a type of a vehicle traffic lane immediately before the vehicle M enters the intersection is a right-turn-only lane, a case where the right-turn signal of the vehicle M is operated, or a case where the target route set by the locator unit 36 indicates a right-turn direction in the intersection.

When the vehicle M has the intention to enter the right-turn destination road but is not able to enter the right-turn destination road because the turning amount is insufficient along the current predicted traveling path of the vehicle M (predicted traveling path Cm) (see, for example, FIGS. 7 and 11), the traveling ECU 14 corrects the predicted traveling path Cm. That is, the traveling ECU 14 executes minor correction on the predicted traveling path Cm under the assumption that the predicted traveling path Cm may change to a state in which the vehicle M is able to enter the right-turn destination road by the driver's steering operation or the like while the vehicle M is traveling in the intersection.

When correcting the predicted traveling path, the traveling ECU 14 detects an intersection corner P1 closest to the vehicle M in the right-turn direction of the vehicle M.

The traveling ECU 14 calculates, as a limit traveling path, a traveling path (outermost path) that is a limit to guide the vehicle M inward in the turning direction (to the inside of the right-turn destination road) relative to the intersection corner P1 by turning with a minimum turning radius r1 of the vehicle M. The minimum turning radius r1 of the vehicle M is preset in the specifications of the vehicle M.

Figure 8:
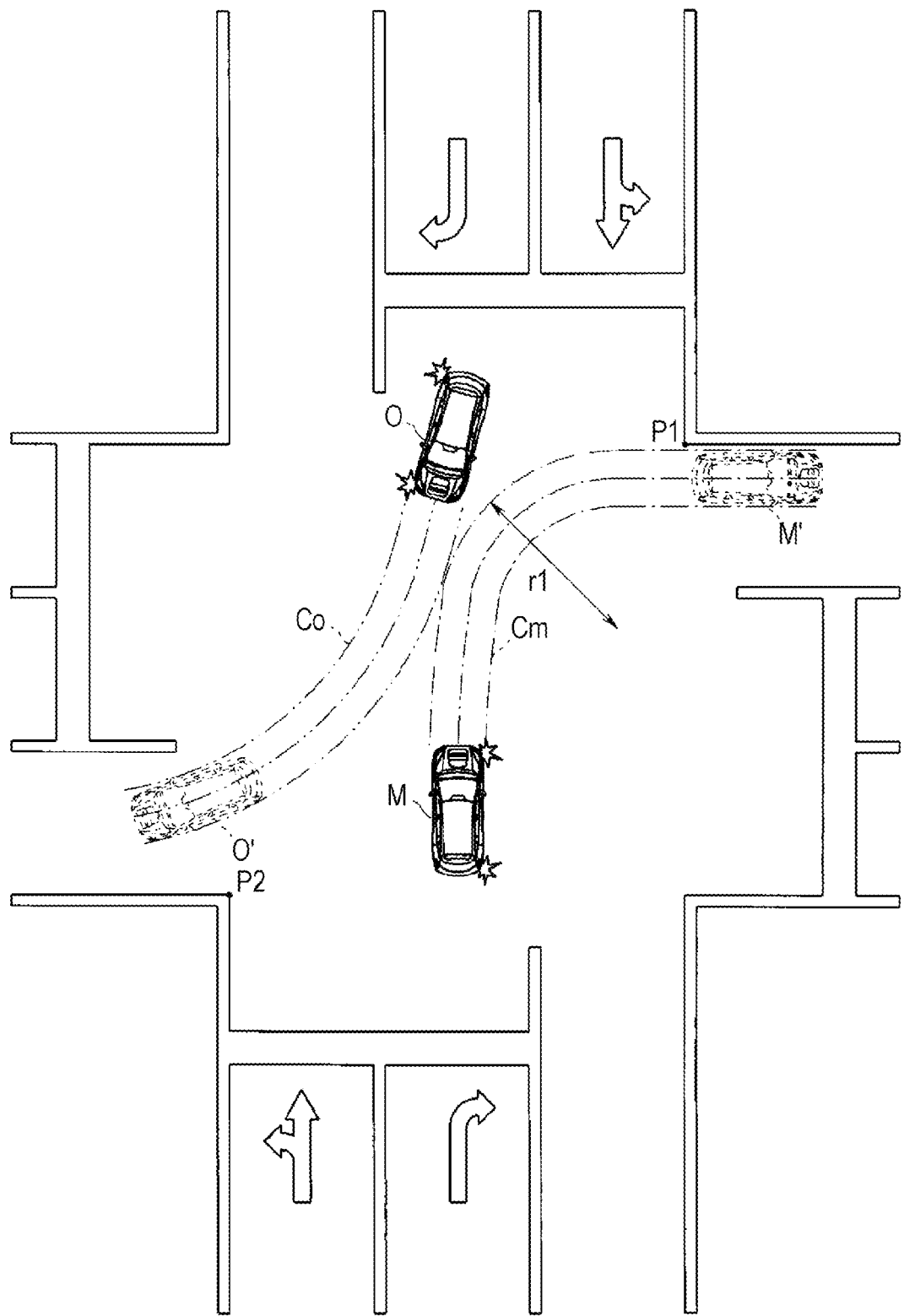
FIG. 8 is a diagram illustrating the predicted traveling path and the oncoming-vehicle predicted traveling path in FIG. 7 after the correction process.
Figure 12:
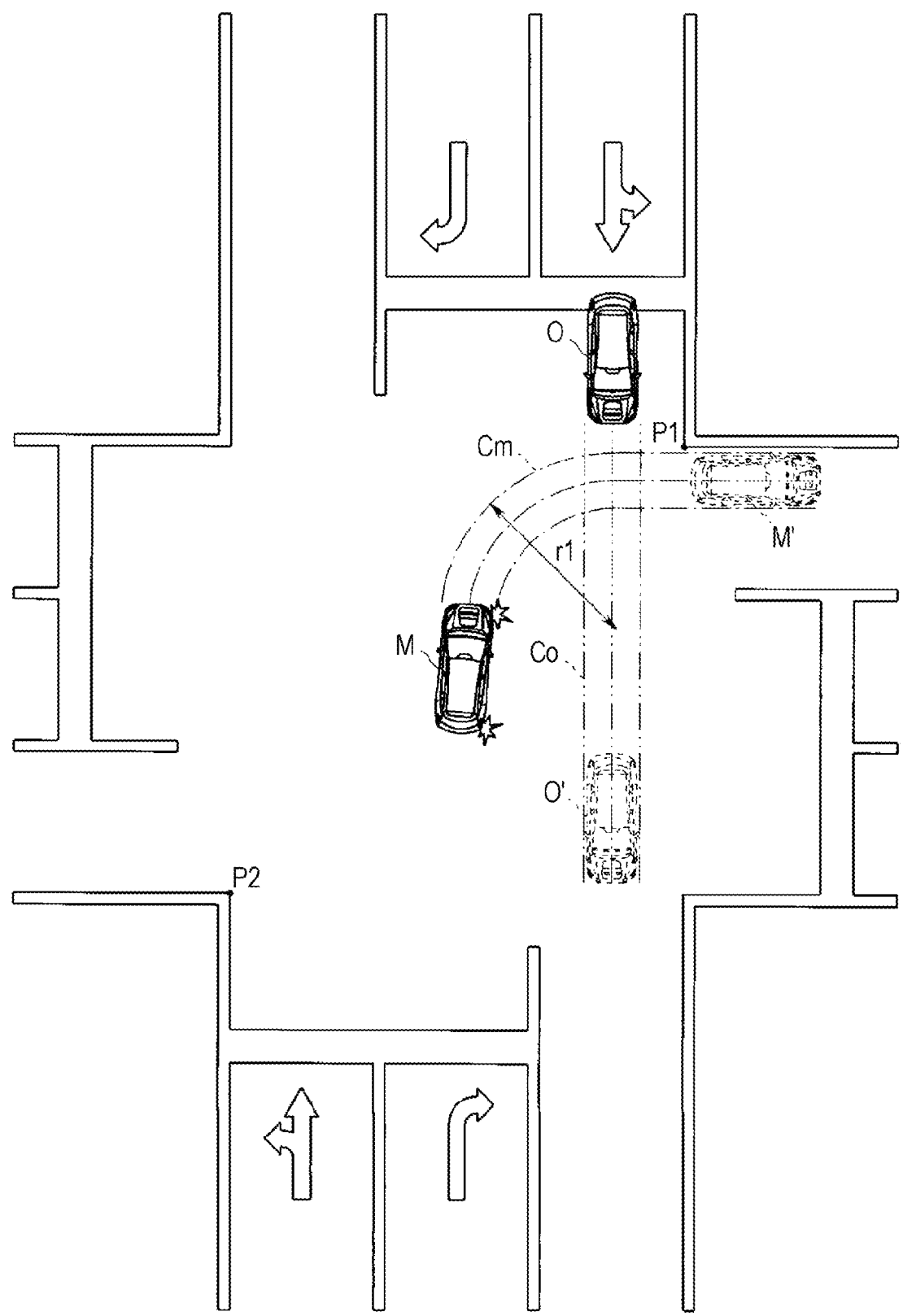
FIG. 12 is a diagram illustrating the predicted traveling path and the oncoming-vehicle predicted traveling path in FIG. 11 after the correction process.

The traveling ECU 14 corrects (sets again) the current predicted traveling path Cm to the limit traveling path (see, for example, FIGS. 8 and 12).

When the oncoming vehicle O that is the three-dimensional object has entered the intersection, the traveling ECU 14 determines whether the oncoming vehicle O (driver of the oncoming vehicle O) has a right-turn intention in the intersection. That is, the traveling ECU 14 determines whether the oncoming vehicle O has an intention to turn (to the right) in the intersection to enter a right-turn destination road (second intersecting road) across a traveling lane for the vehicle M. The traveling lane for the vehicle M may include: a first traveling lane where the vehicle M is travelling; a second traveling lane where the vehicle M is to be travelled in a case where the vehicle M travels straight ahead from the first traveling lane across the intersection; and a region of the intersection between the first traveling lane and the second traveling lane.

For example, the traveling ECU 14 determines that the oncoming vehicle O has the right-turn intention in the intersection in at least one of a case where a type of an oncoming-vehicle traffic lane immediately before the oncoming vehicle O enters the intersection is a right-turn-only lane or a case where the right-turn signal of the oncoming vehicle O is blinking.

When the oncoming vehicle O has the intention to enter the right-turn destination road (left-turn destination road for the vehicle M) but is not able to enter the right-turn destination road because the turning amount is insufficient along the current predicted traveling path of the oncoming vehicle O (oncoming-vehicle predicted traveling path Co) (see, for example, FIG. 9), the traveling ECU 14 corrects the oncoming-vehicle predicted traveling path Co. That is, the traveling ECU 14 executes minor correction on the oncoming-vehicle predicted traveling path Co under the assumption that the oncoming-vehicle predicted traveling path Co may change to a state in which the oncoming vehicle O is able to enter the right-turn destination road by the driver's steering operation or the like while the oncoming vehicle O is traveling in the intersection.

When correcting the oncoming-vehicle predicted traveling path, the traveling ECU 14 detects an intersection corner P2 closest to the oncoming vehicle O in the right-turn direction of the oncoming vehicle O.

The traveling ECU 14 calculates, as an oncoming-vehicle limit traveling path, a traveling path (outermost path) that is a limit to guide the oncoming vehicle O inward in the turning direction (to the inside of the right-turn destination road) relative to the intersection corner P2 by turning with a minimum turning radius r2 of the oncoming vehicle O. The minimum turning radius r2 of the oncoming vehicle O is a fixed value (for example, 5.5 m) preset as a minimum turning radius of general vehicles.

Figure 10:
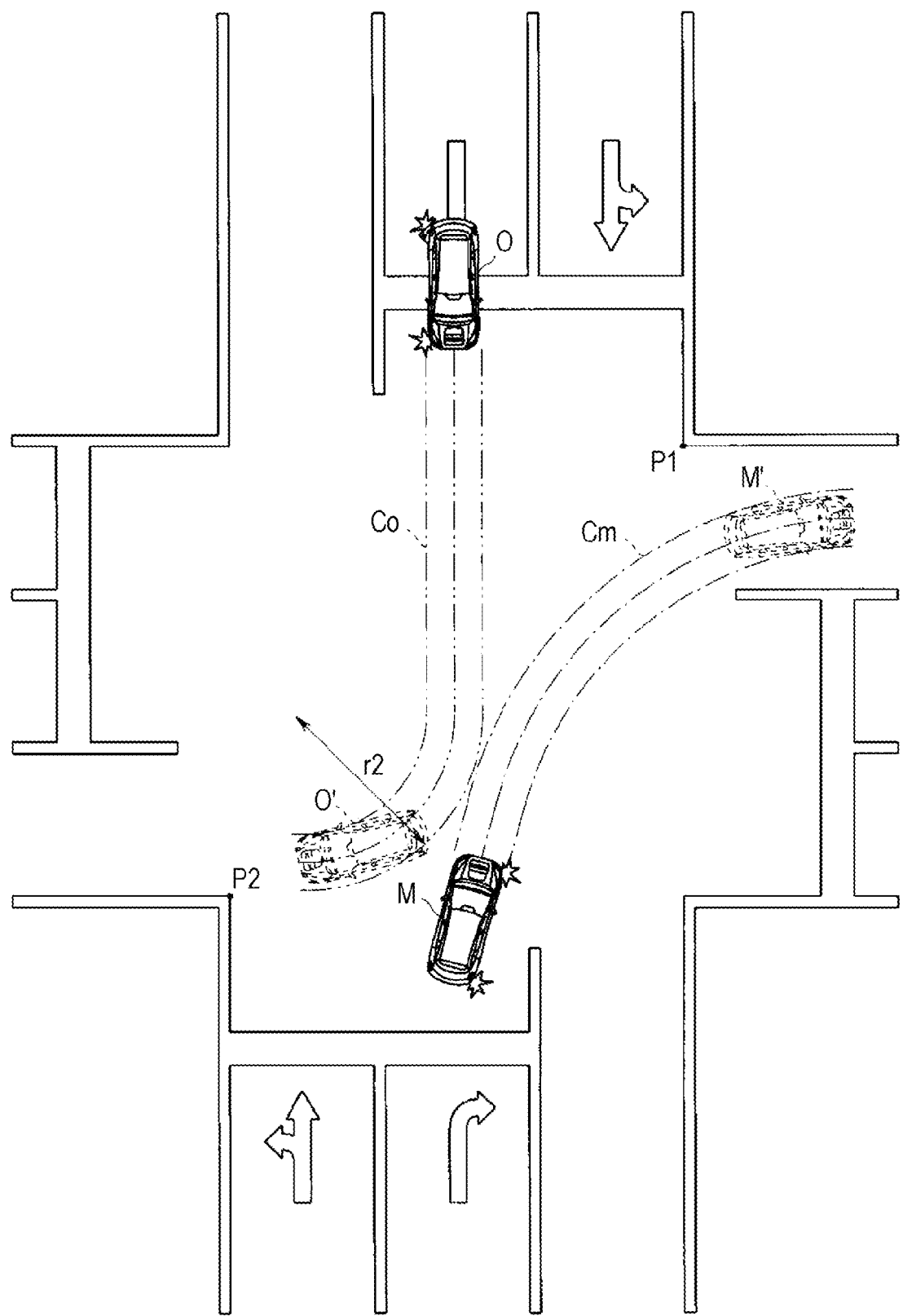
FIG. 10 is a diagram illustrating the predicted traveling path and the oncoming-vehicle predicted traveling path in FIG. 9 after the correction process.

The traveling ECU 14 corrects (sets again) the current oncoming-vehicle predicted traveling path Co to the oncoming-vehicle limit traveling path (see, for example, FIG. 10).

In one embodiment, the traveling ECU 14 may serve as a "predicted traveling path calculator", an "oncoming-vehicle predicted traveling path calculator", a "turning intention determiner", a "vehicle predicted traveling path corrector", an "oncoming-vehicle turning intention determiner", an "oncoming-vehicle predicted traveling path corrector", and a "control target setter".

Next, the emergency braking control to be executed by the traveling ECU 14 is described with reference to a flowchart illustrating an emergency braking control routine in FIG. 3. This routine is repeated at every set time by the traveling ECU 14.

When the routine is started, the traveling ECU 14 checks in Step S101 whether various three-dimensional objects such as a preceding vehicle L and an oncoming vehicle O are present ahead of the vehicle M.

When determination is made in Step S101 that no three-dimensional object is present ahead of the vehicle M, the traveling ECU 14 terminates the routine.

When determination is made in Step S101 that the three-dimensional objects are present ahead of the vehicle M, the traveling ECU 14 proceeds to Step S102 to calculate a predicted traveling path of the vehicle M. That is, the traveling ECU 14 calculates a predicted traveling path Cm up to the timing of elapse of the set period N based on driving conditions of the vehicle M (for example, a vehicle speed, a steering angle, and a yaw rate).

In Step S103, the traveling ECU 14 calculates a predicted traveling path of each three-dimensional object ahead of the vehicle M. For example, when the preceding vehicle L is present ahead of the vehicle M, the traveling ECU 14 calculates a preceding-vehicle predicted traveling path Cl up to the timing of elapse of the set period N based on the behavior of the preceding vehicle L (for example, a moving speed and a moving direction). For example, when the oncoming vehicle O is present ahead of the vehicle M, the traveling ECU 14 calculates an oncoming-vehicle predicted traveling path Co up to the timing of elapse of the set period N based on the behavior of the oncoming vehicle O (for example, a moving speed and a moving direction).

In Step S104, the traveling ECU 14 checks whether the vehicle M has entered an intersection.

When determination is made in Step S104 that the vehicle M is not in the intersection, the traveling ECU 14 proceeds to Step S106.

Figure 4:
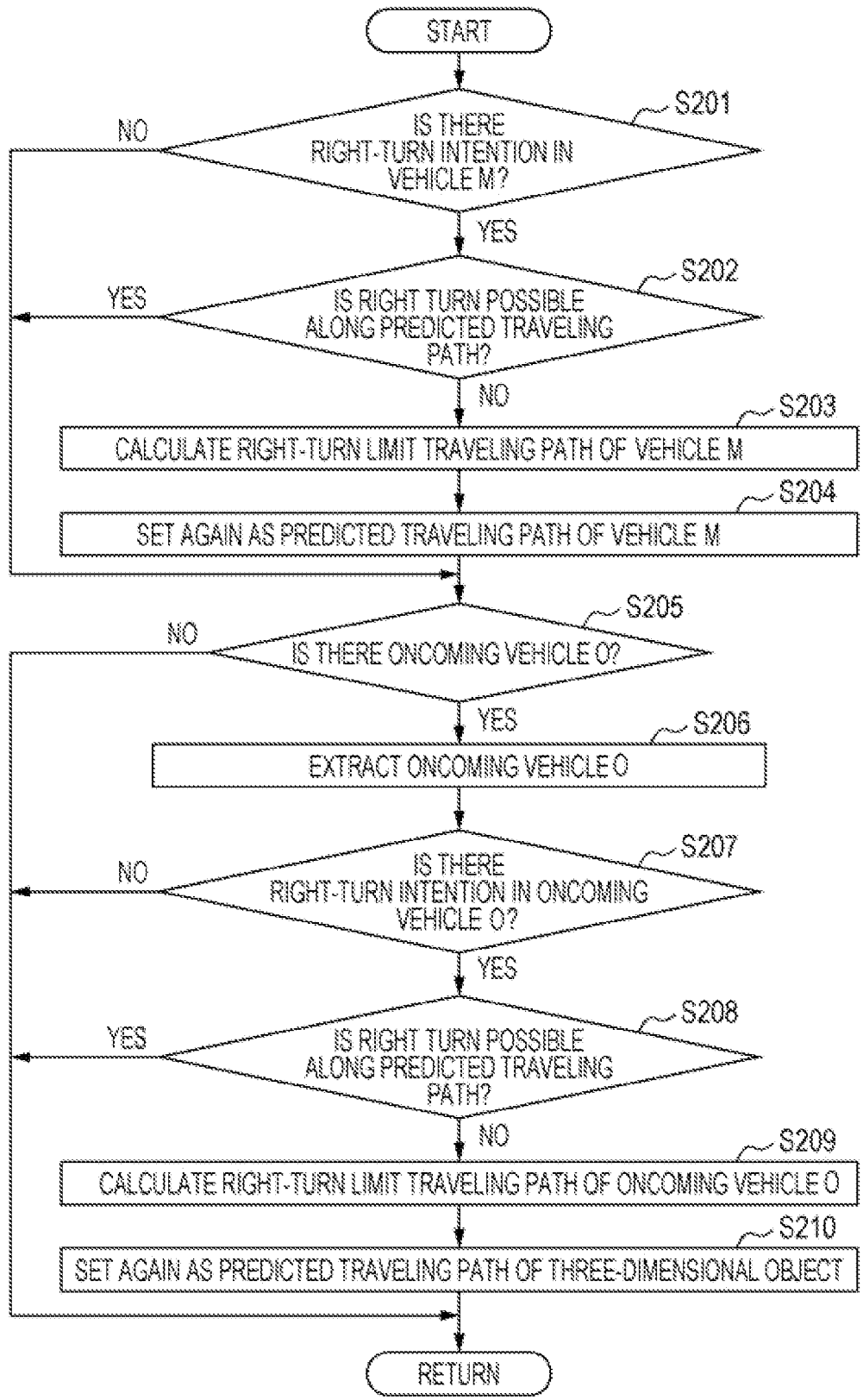
FIG. 4 is a flowchart illustrating a predicted traveling path correction process subroutine.

When determination is made in Step S104 that the vehicle M is in the intersection, the traveling ECU 14 proceeds to Step S105 to execute a predicted traveling path correction process. The predicted traveling path correction process is executed for the predicted traveling path Cm and the oncoming-vehicle predicted traveling path Co as appropriate. For example, the predicted traveling path correction process is executed with reference to a flowchart illustrating a predicted traveling path correction process subroutine in FIG. 4.

When the subroutine is started, the traveling ECU 14 checks in Step S201 whether the vehicle M has a right-turn intention in the intersection. For example, the traveling ECU 14 checks whether the vehicle M has the right-turn intention in the intersection based on the type of the vehicle traffic lane immediately before the vehicle M enters the intersection, the status of operation on the right-turn signal, and the target route set by the locator unit 36.

When determination is made in Step S201 that the vehicle M does not have the right-turn intention in the intersection, the traveling ECU 14 proceeds to Step S205.

When determination is made in Step S201 that the vehicle M has the right-turn intention in the intersection, the traveling ECU 14 proceeds to Step S202 to check whether the vehicle M is able to turn right along the current predicted traveling path Cm. That is, the traveling ECU 14 checks whether the vehicle M is able to enter a right-turn destination road along the current predicted traveling path Cm.

When determination is made in Step S202 that the vehicle M is able to turn right along the current predicted traveling path Cm, the traveling ECU 14 proceeds to Step S205.

When determination is made in Step S202 that the vehicle M is not able to turn right along the current predicted traveling path Cm, the traveling ECU 14 proceeds to Step S203 to calculate a limit traveling path for causing the vehicle M to turn right.

In Step S204, the traveling ECU 14 sets again the limit traveling path calculated in Step S203 as the predicted traveling path Cm, and then proceeds to Step S205.

In Step S205 from Step S201, S202, or S204, the traveling ECU 14 checks whether the oncoming vehicle O is present among the three-dimensional objects detected ahead of the vehicle M.

When determination is made in Step S205 that the oncoming vehicle O is not present among the three-dimensional objects, the traveling ECU 14 terminates the subroutine.

When determination is made in Step S205 that the oncoming vehicle O is present among the three-dimensional objects, the traveling ECU 14 proceeds to Step S206 to extract the oncoming vehicle O as a target of the correction process.

In Step S207, the traveling ECU 14 checks whether the extracted oncoming vehicle O has a right-turn intention in the intersection. For example, the traveling ECU 14 checks whether the oncoming vehicle O has the right-turn intention in the intersection based on a type of an oncoming-vehicle traffic lane immediately before the oncoming vehicle O enters the intersection and the status of blinking of the right-turn signal.

When determination is made in Step S207 that the oncoming vehicle O does not have the right-turn intention in the intersection, the traveling ECU 14 terminates the subroutine.

When determination is made in Step S207 that the oncoming vehicle O has the right-turn intention in the intersection, the traveling ECU 14 proceeds to Step S208 to check whether the oncoming vehicle O is able to turn right along the current oncoming-vehicle predicted traveling path Co. That is, the traveling ECU 14 checks whether the oncoming vehicle O is able to enter a right-turn destination road along the current oncoming-vehicle predicted traveling path Co.

When determination is made in Step S208 that the oncoming vehicle O is able to turn right along the current oncoming-vehicle predicted traveling path Co, the traveling ECU 14 terminates the subroutine.

When determination is made in Step S208 that the oncoming vehicle O is not able to turn right along the current oncoming-vehicle predicted traveling path Co, the traveling ECU 14 proceeds to Step S209 to calculate a limit traveling path for causing the oncoming vehicle O to turn right (oncoming-vehicle limit traveling path).

In Step S210, the traveling ECU 14 sets again the oncoming-vehicle limit traveling path calculated in Step S209 as the oncoming-vehicle predicted traveling path Co, and then terminates the subroutine.

Figure 3:
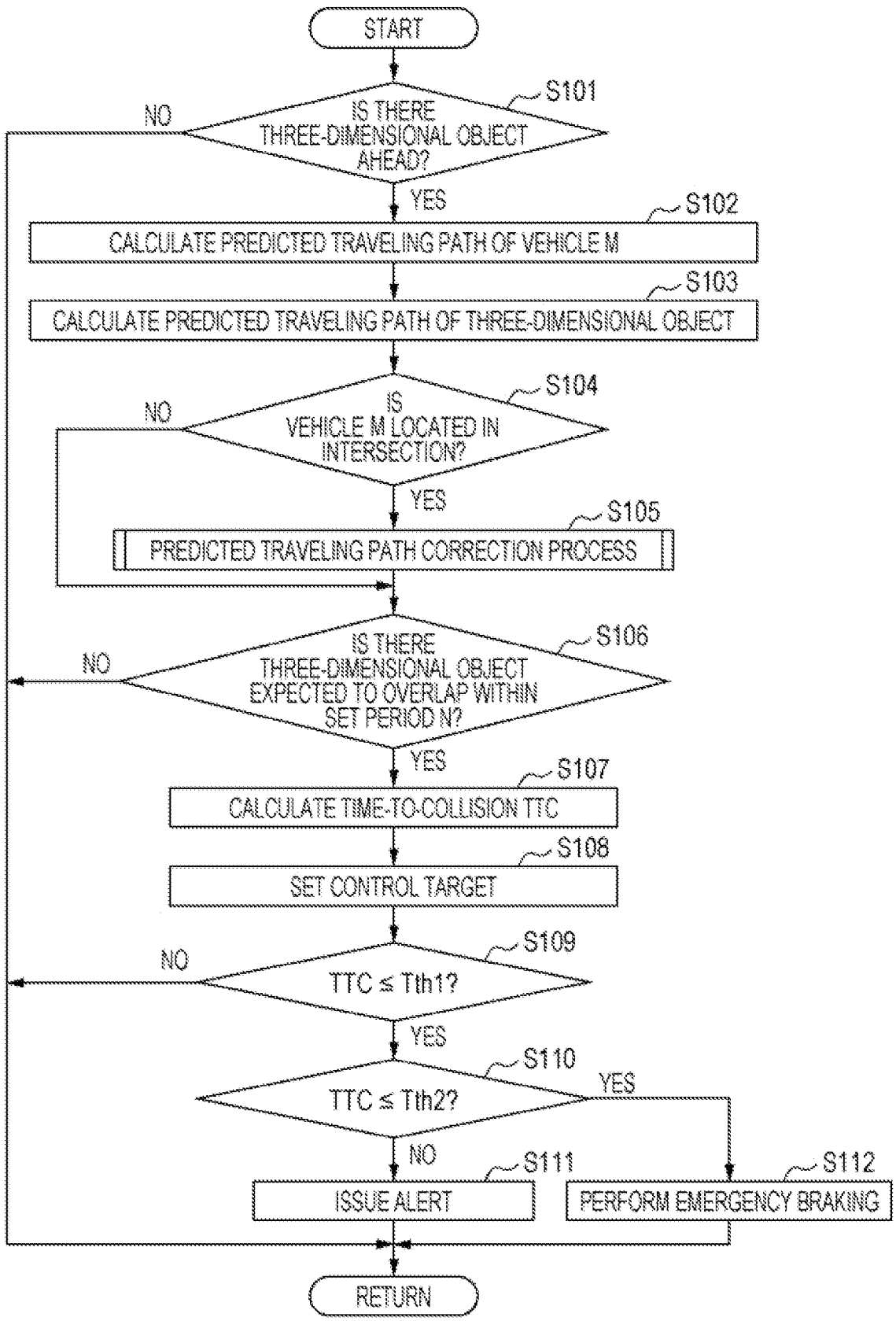
FIG. 3 is a flowchart illustrating an emergency braking control routine.

In the main routine of FIG. 3, the traveling ECU 14 checks in Step S106 from Step S104 or S105 whether there is a three-dimensional object expected to overlap the predicted traveling path Cm within the set period N. That is, the traveling ECU 14 checks whether there is a three-dimensional object (either one of the preceding vehicle L and the oncoming vehicle O) whose predicted traveling path (for example, either one of the preceding-vehicle predicted traveling path Cl and the oncoming-vehicle predicted traveling path Co) is expected to overlap the predicted traveling path Cm before the timing of elapse of the set period N.

When determination is made in Step S106 that there is no three-dimensional object expected to overlap the predicted traveling path Cm before the timing of elapse of the set period N, the traveling ECU 14 terminates the routine.

When determination is made in Step S106 that there is a three-dimensional object expected to overlap the predicted traveling path Cm before the timing of elapse of the set period N, the traveling ECU 14 proceeds to Step S107 to calculate a time-to-collision TTC of each three-dimensional object expected to overlap the predicted traveling path Cm.

In Step S108, the traveling ECU 14 sets, as an emergency braking control target Trg, the three-dimensional object having the shortest time-to-collision TTC in Step S107.

In Step S109 from Step S108, the traveling ECU 14 checks whether the time-to-collision TTC of the control target Trg is equal to or shorter than the preset first threshold Tth1 (Tth1<N).

When determination is made in Step S109 that the time-to-collision TTC is longer than the first threshold Tth1, the traveling ECU 14 terminates the routine.

When determination is made in Step S109 that the time-to-collision TTC is equal to or shorter than the first threshold Tth1, the traveling ECU 14 proceeds to Step S110 to check whether the time-to-collision TTC of the control target Trg is equal to or shorter than the preset second threshold Tth2 (Tth2<Tth1).

When determination is made in Step S110 that the time-to-collision TTC is longer than the second threshold Tth2, the traveling ECU 14 proceeds to Step S111 to issue an alert about the control target Trg, and then terminates the routine.

When determination is made in Step S110 that the time-to-collision TTC is equal to or shorter than the second threshold Tth2, the traveling ECU 14 proceeds to Step S112 to execute emergency braking against the control target Trg, and then terminates the routine.

According to the embodiment, the traveling ECU 14 calculates the predicted traveling path Cm based on the driving conditions of the vehicle M and, when the oncoming vehicle O is detected based on the traveling environment information, calculates the oncoming-vehicle predicted traveling path Co based on the behavior of the oncoming vehicle O. The traveling ECU 14 determines whether the vehicle M has the intention to turn right in the intersection to enter the right-turn destination road. When the vehicle M has the intention to enter the right-turn destination road but is not able to enter the right-turn destination road along the current predicted traveling path Cm, the traveling ECU 14 corrects the predicted traveling path Cm to the limit traveling path for causing the vehicle M to enter the right-turn destination road. The traveling ECU 14 determines whether the oncoming vehicle O has the intention to turn right in the intersection to enter the right-turn destination road. When the oncoming vehicle O has the right-turn intention in the intersection but is not able to enter the right-turn destination road along the current oncoming-vehicle predicted traveling path Co, the traveling ECU 14 corrects the oncoming-vehicle predicted traveling path Co to the limit traveling path for causing the oncoming vehicle O to enter the right-turn destination road. When the predicted traveling path Cm and the oncoming-vehicle predicted traveling path Co up to the timing of elapse of the set period N are expected to overlap each other at least in part, the traveling ECU 14 sets the oncoming vehicle O as the control target of the emergency braking. Thus, it is possible to suppress execution of inappropriate emergency braking against the oncoming vehicle O in the intersection.

When both the vehicle M and the oncoming vehicle O turn right in the intersection, the predicted traveling path Cm and the oncoming-vehicle predicted traveling path Co do not basically overlap each other. Therefore, there is a small possibility of execution of the emergency braking. However, the steering start timings in the intersection greatly differ depending on drivers. The predicted traveling path Cm and the oncoming-vehicle predicted traveling path Co may overlap each other depending on the steering timings of the drivers.

Figure 6:
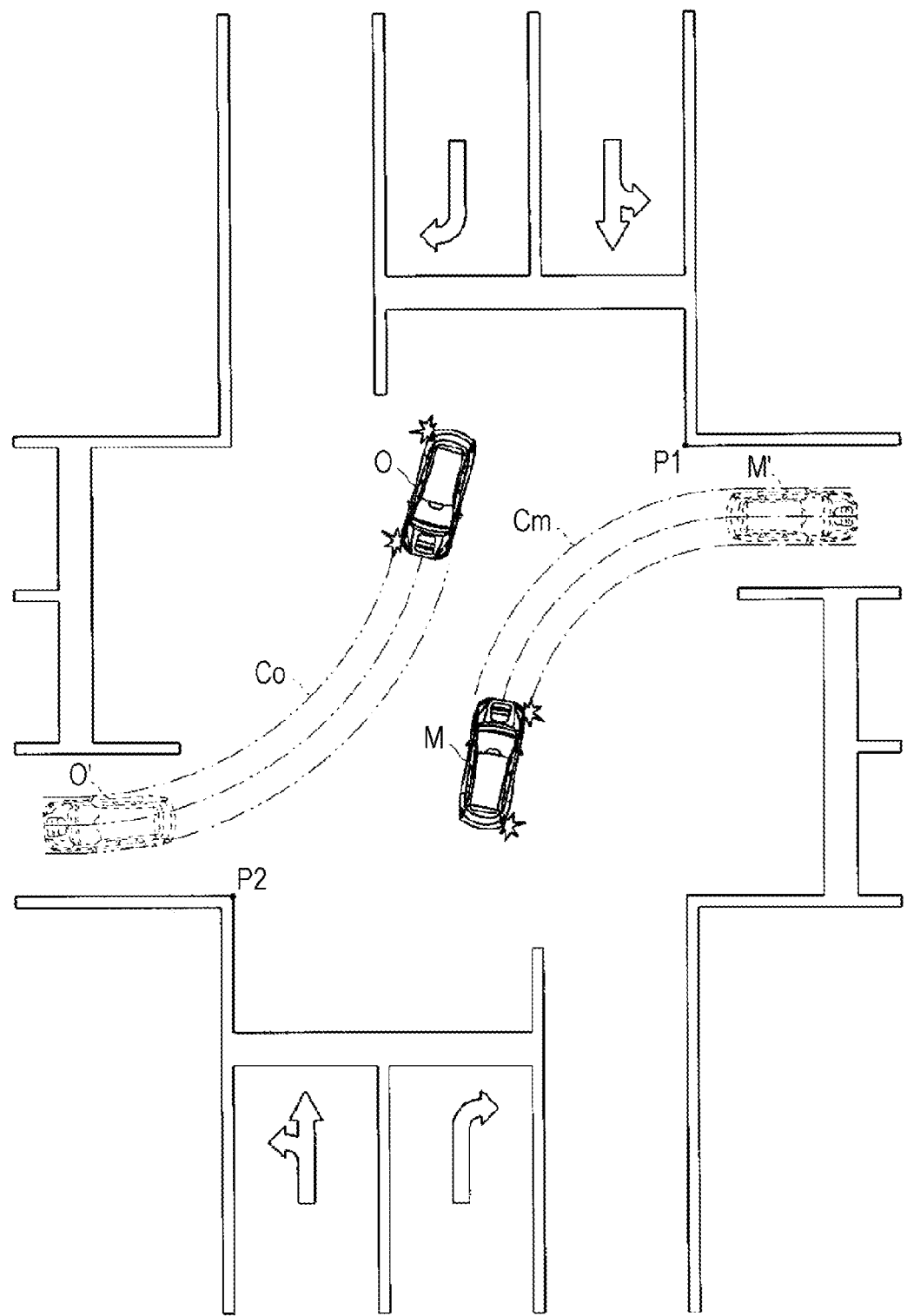
FIG. 6 is a diagram illustrating a predicted traveling path and an oncoming-vehicle predicted traveling path in an intersection when both a vehicle and an oncoming vehicle have started sufficient right-turn operations.

For example, in a case where both the driver of the vehicle M and the driver of the oncoming vehicle O have started steering toward the right-turn destination roads at relatively early timings after the entry into the intersection as illustrated in FIG. 6, there is a small possibility of overlap between the predicted traveling path Cm and the oncoming-vehicle predicted traveling path Co. In this case, there is a small possibility that the oncoming vehicle O becomes the emergency braking control target Trg.

Figure 7:
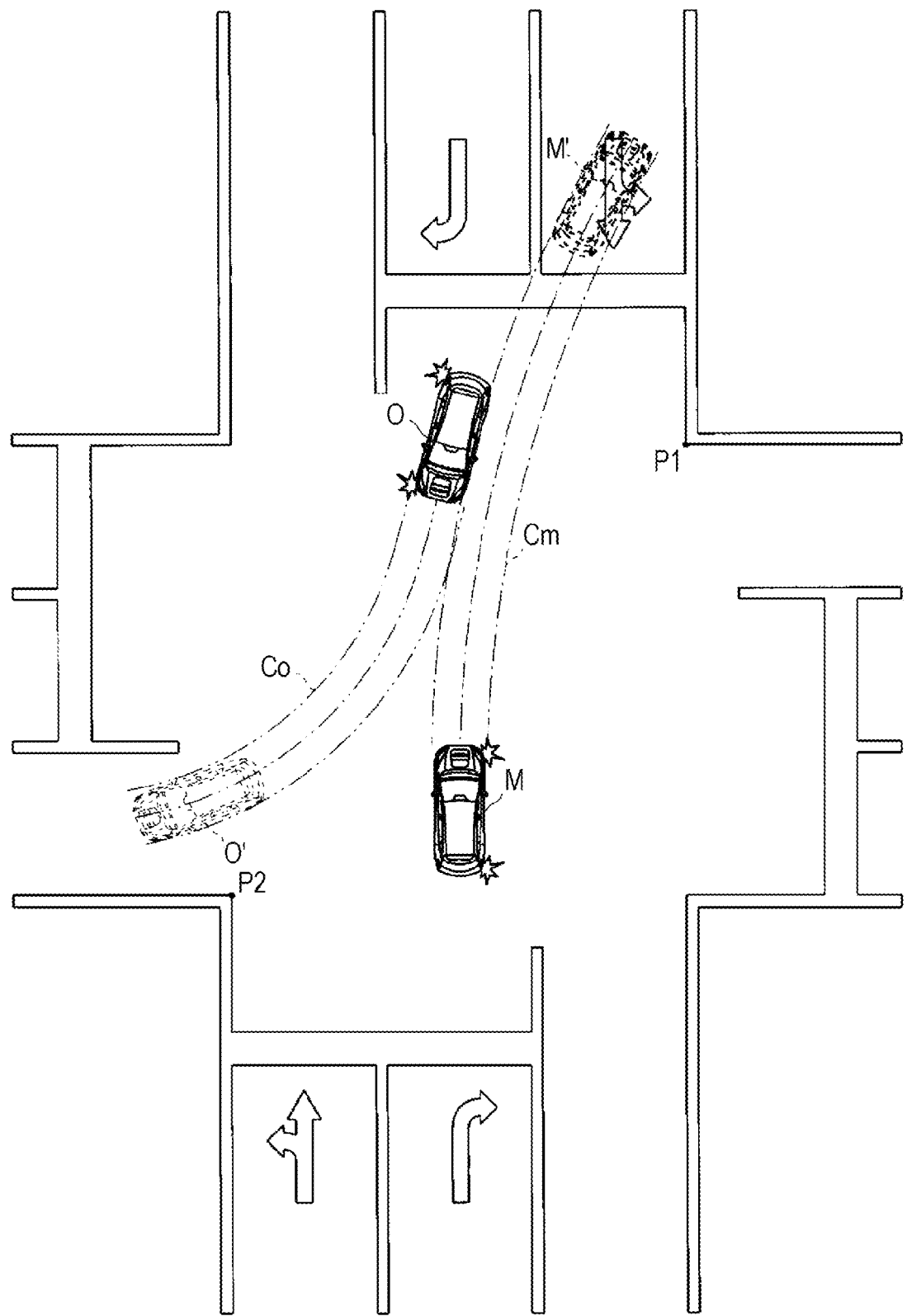
FIG. 7 is a diagram illustrating the predicted traveling path and the oncoming-vehicle predicted traveling path in the intersection when the vehicle has not started the sufficient right-turn operation and the oncoming vehicle has started the sufficient right-turn operation.

For example, in a case where the timing to start steering of the vehicle M toward the right-turn destination road is late as illustrated in FIG. 7, there is a strong possibility of partial overlap between the predicted traveling path Cm and the oncoming-vehicle predicted traveling path Co. In this case, there is a strong possibility that the oncoming vehicle O becomes the emergency braking control target Trg though the oncoming vehicle O turns in the right-turn direction in which collision with the vehicle M can be avoided.

For example, as illustrated in FIG. 8, the predicted traveling path Cm is corrected in the expectation that the vehicle M will start steering to turn right. Therefore, it is possible to reduce the possibility of partial overlap between the predicted traveling path Cm and the oncoming-vehicle predicted traveling path Co, thereby suppressing the execution of inappropriate emergency braking.

Figure 9:
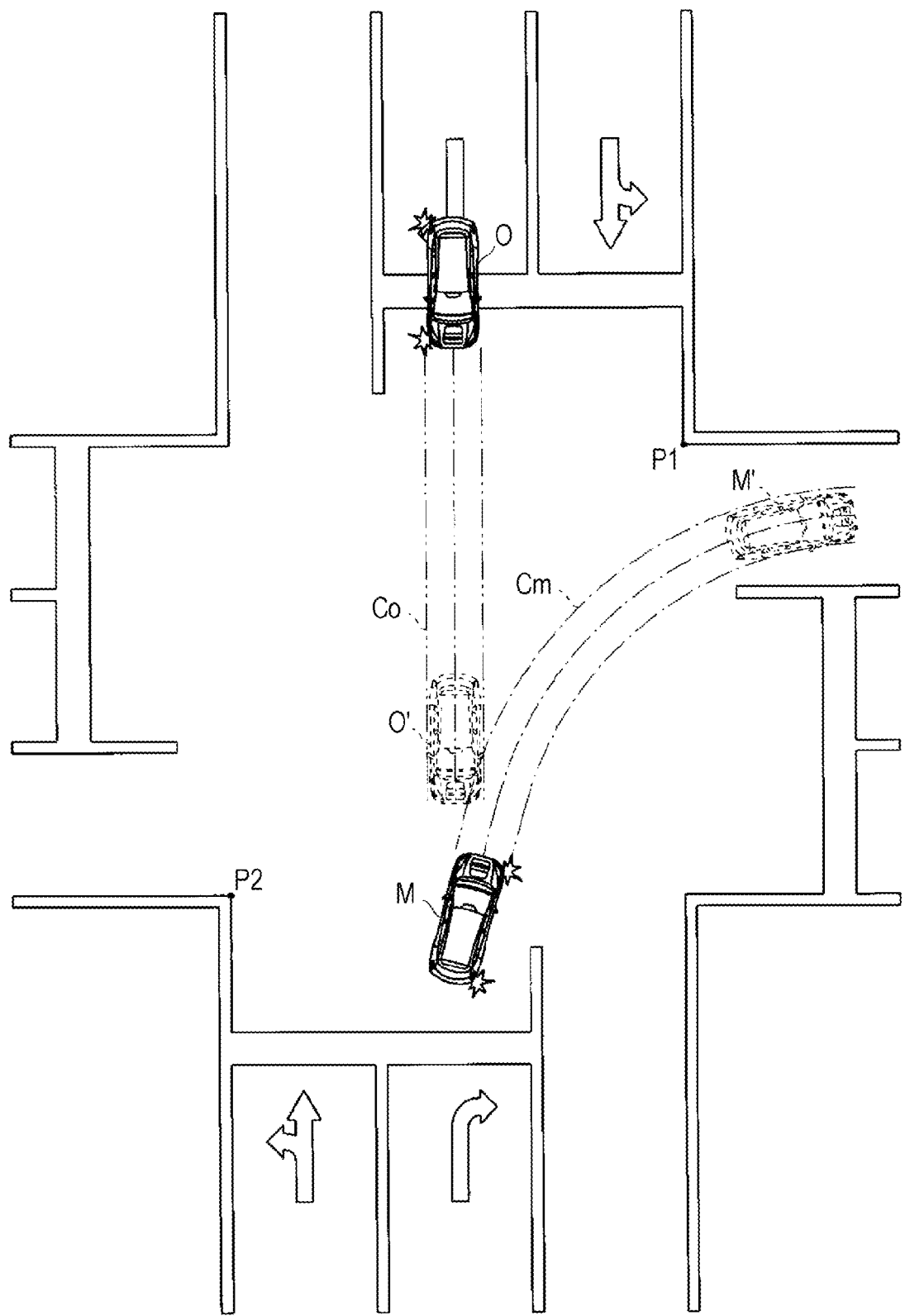
FIG. 9 is aa diagram illustrating the predicted traveling path and the oncoming-vehicle predicted traveling path in the intersection when the vehicle has started the sufficient right-turn operation and the oncoming vehicle has not started the sufficient right-turn operation.

For example, in a case where the timing to start steering of the oncoming vehicle O toward the right-turn destination road is late as illustrated in FIG. 9, there is a strong possibility of partial overlap between the predicted traveling path Cm and the oncoming-vehicle predicted traveling path Co. In this case, there is a strong possibility that the oncoming vehicle O becomes the emergency braking control target Trg though the oncoming vehicle O turns in the right-turn direction in which collision with the vehicle M can be avoided.

For example, as illustrated in FIG. 10, the oncoming-vehicle predicted traveling path Co is corrected in the expectation that the oncoming vehicle O will start steering to turn right. Therefore, it is possible to reduce the possibility of partial overlap between the predicted traveling path Cm and the oncoming-vehicle predicted traveling path Co, thereby suppressing the execution of inappropriate emergency braking.

Figure 11:
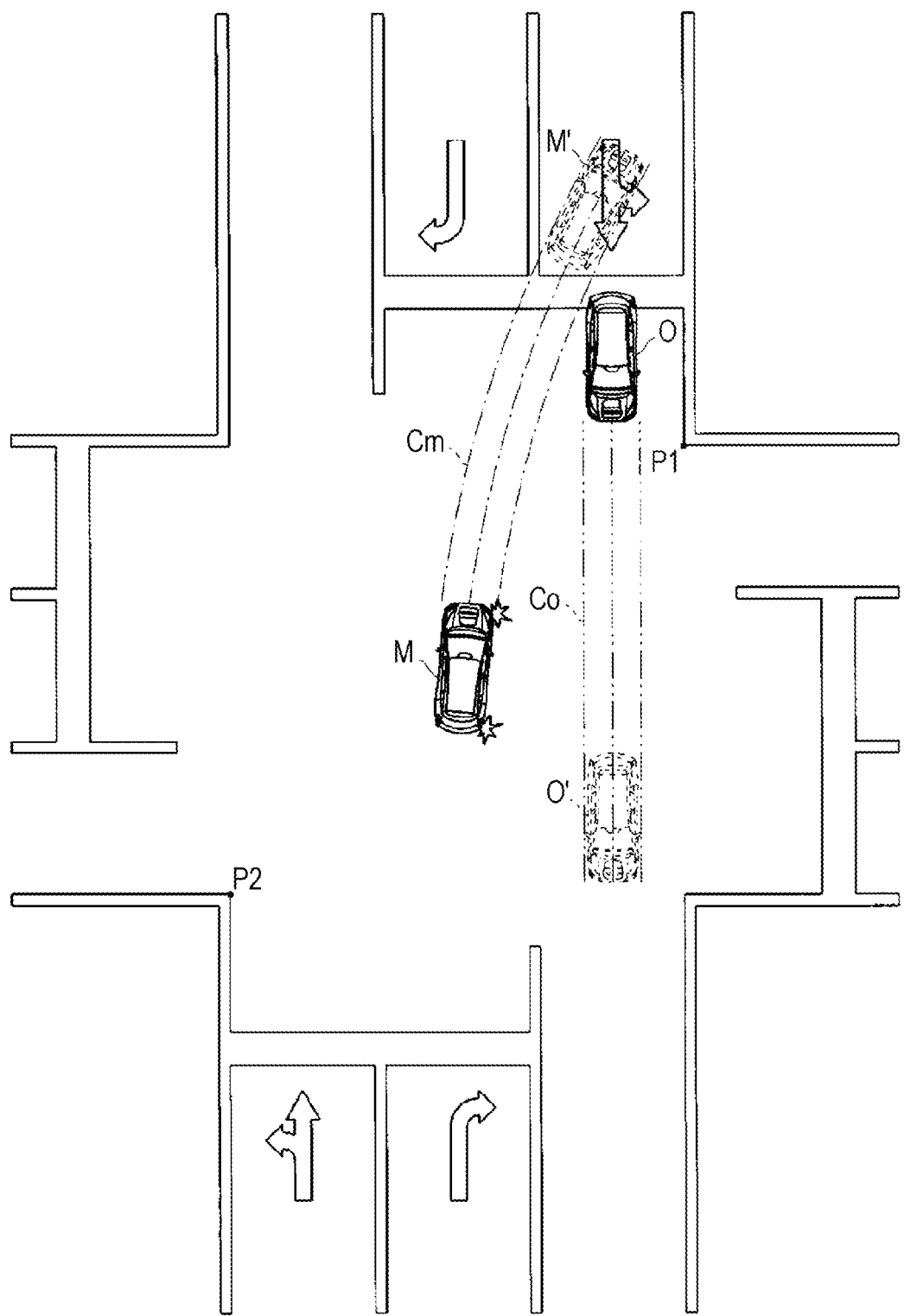
FIG. 11 is a diagram illustrating the predicted traveling path and the oncoming-vehicle predicted traveling path in the intersection when the vehicle has not started the sufficient right-turn operation and the oncoming vehicle travels straightforward.

For example, in a case where the vehicle M has the right-turn intention but the oncoming vehicle O does not have the right-turn intention and the timing to start steering of the vehicle M toward the right-turn destination road is late as illustrated in FIG. 11, there is a possibility that the oncoming-vehicle predicted traveling path Co does not overlap (intersect) the predicted traveling path Cm. In this case, there is a strong possibility that the oncoming vehicle O does not become the emergency braking control target Trg despite the strong possibility of collision with the vehicle M.

For example, as illustrated in FIG. 12, the predicted traveling path Cm is corrected in the expectation that the vehicle M will start steering to turn right. Therefore, the predicted traveling path Cm and the oncoming-vehicle predicted traveling path Co can overlap each other, thereby executing the emergency braking as appropriate.

When correcting the predicted traveling path Cm, the traveling ECU 14 detects the intersection corner P1 closest to the vehicle M in the turning direction of the vehicle M to enter the right-turn destination road, and calculates the minimal limit traveling path (minimally made closer to the right-turn destination road) to guide the vehicle M inward in the turning direction relative to the intersection corner P1 with the minimum turning radius r1 of the vehicle M. Thus, the-vehicle predicted traveling path Cm can appropriately be corrected in consideration of the driving conditions of the vehicle M.

When correcting the oncoming-vehicle predicted traveling path Co, the traveling ECU 14 detects the intersection corner P2 closest to the oncoming vehicle O in the turning direction of the oncoming vehicle O to enter the right-turn destination road, and calculates the minimal oncoming-vehicle limit traveling path (minimally made closer to the right-turn destination road) to guide the oncoming vehicle O inward in the turning direction relative to the intersection corner P2 with the minimum turning radius r2 of the oncoming vehicle O. Thus, the oncoming-vehicle predicted traveling path Co can appropriately be corrected in consideration of the behavior of the oncoming vehicle O.

In the embodiment described above, the IPU 12, the image recognition ECU 13, the traveling ECU 14, the CP_ECU 21, the E/G_ECU 22, the T/M_ECU 23, the BK_ECU 24, and the PS_ECU 25 are each implemented by a known microcomputer including a CPU, a RAM, a ROM, and a non-volatile storage and peripheral devices around the microcomputer. The ROM prestores programs to be executed by the CPU and fixed data such as data tables. All or a part of the functions of the processor may be implemented by a logic or analog circuit, and processes in various programs may be implemented by an electronic circuit such as an FPGA.

The embodiment of the disclosure is not limited to the embodiment described above, and various modifications may be made without departing from the gist in the implementation.

For example, the embodiment described above is directed to the example in which the driving assistance device 1 is applied to left-hand traffic in accordance with laws and regulations. The driving assistance device 1 is also applicable to right-hand traffic in accordance with laws and regulations by replacing "right" with "left" and "left" with "right" in the embodiment described above.

The embodiment includes various aspects of the disclosure that may be extracted by any appropriate combination of a plurality of disclosed constituent elements.

For example, some of the constituent elements in the embodiment may be omitted as long as the problems described above can be solved and the effects described above can be attained.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance device for a vehicle, comprising:
    a traveling environment recognizer configured to recognize traveling environment information related to an outside of the vehicle;
    a predicted traveling path calculator configured to calculate a predicted traveling path for the vehicle based on a driving condition of the vehicle;
    an oncoming-vehicle predicted traveling path calculator configured to, in a case where an oncoming vehicle is detected based on the traveling environment information, calculate an oncoming-vehicle predicted traveling path for the oncoming vehicle based on behavior of the oncoming vehicle;
    a turning intention determiner configured to determine whether the vehicle has an intention to enter a first intersecting road across an oncoming lane by turning in an intersection;
    a predicted traveling path corrector configured to, in a case where the vehicle has the intention to enter the first intersecting road but is unable to enter the first intersecting road along the predicted traveling path, correct the predicted traveling path to a limit traveling path for causing the vehicle to enter the first intersecting road;

an oncoming-vehicle turning intention determiner configured to determine whether the oncoming vehicle has an intention to enter a second intersecting road across a traveling lane for the vehicle by turning in the intersection;

an oncoming-vehicle predicted traveling path corrector configured to, in a case where the oncoming vehicle has the intention to enter the second intersecting road but is unable to enter the second intersecting road along the oncoming-vehicle predicted traveling path, correct the oncoming-vehicle predicted traveling path to an oncoming-vehicle limit traveling path for causing the oncoming vehicle to reach the second intersecting road; and a control target setter configured to set the oncoming vehicle as a control target against which emergency braking is executed in a case where the predicted traveling path up to a preset timing and the oncoming-vehicle predicted traveling path up to the preset timing are expected to overlap each other at least in part.

2. The driving assistance device for the vehicle according to claim 1, wherein the predicted traveling path corrector is configured to detect a first corner of the intersection closest to the vehicle in a turning direction to enter the first intersecting road, and calculate, as the limit traveling path, a traveling path to guide the vehicle inward relative to the first corner by turning with a minimum turning radius of the vehicle.

3. The driving assistance device for the vehicle according to claim 1, wherein the oncoming-vehicle predicted traveling path corrector is configured to detect a second corner of the intersection closest to the oncoming vehicle in a turning direction to enter the second intersecting road, and calculate, as the oncoming-vehicle limit traveling path, a traveling path to guide the oncoming vehicle inward relative to the second corner by turning with a minimum turning radius of the oncoming vehicle.

4. The driving assistance device for the vehicle according to claim 2, wherein the oncoming-vehicle predicted traveling path corrector is configured to detect a second corner of the intersection closest to the oncoming vehicle in a turning direction to enter the second intersecting road, and calculate, as the oncoming-vehicle limit traveling path, a traveling path to guide the oncoming vehicle inward relative to the second corner by turning with a minimum turning radius of the oncoming vehicle.

5. The driving assistance device for the vehicle according to claim 1, wherein the turning intention determiner is configured to determine whether the vehicle has the intention to enter the first intersecting road based on one or more of: a type of a vehicle traffic lane in which the vehicle upon entering the intersection is traveling; whether a turn signal of the vehicle is operated, and a target traveling route set for the vehicle.

6. The driving assistance device for the vehicle according to claim 2, wherein the turning intention determiner is configured to determine whether the vehicle has the intention to enter the first intersecting road based on one or more of: a type of a vehicle traffic lane in which the vehicle upon entering the intersection is traveling; whether a turn signal of the vehicle is operated, and a target traveling route set for the vehicle.

7. The driving assistance device for the vehicle according to claim 3, wherein the turning intention determiner is configured to determine whether the vehicle has the intention to enter the first intersecting road based on one or more of: a type of a vehicle traffic lane in which the vehicle upon entering the intersection is traveling; whether a turn signal of the vehicle is operated, and a target traveling route set for the vehicle.

8. The driving assistance device for the vehicle according to claim 4, wherein the turning intention determiner is configured to determine whether the vehicle has the intention to enter the first intersecting road based on one or more of: a type of a vehicle traffic lane in which the vehicle upon entering the intersection is traveling; whether a turn signal of the vehicle is operated, and a target traveling route set for the vehicle.

9. The driving assistance device for the vehicle according to claim 1, wherein the oncoming-vehicle turning intention determiner is configured to determine whether the oncoming vehicle has the intention to enter the second intersecting road based on one or both of: a type of a vehicle traffic lane in which the oncoming vehicle upon entering the intersection is traveling; and whether a turn signal is blinking.

10. The driving assistance device for the vehicle according to claim 2, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

11. The driving assistance device for the vehicle according to claim 3, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

12. The driving assistance device for the vehicle according to claim 4, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

13. The driving assistance device for the vehicle according to claim 5, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

14. The driving assistance device for the vehicle according to claim 6, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

15. The driving assistance device for the vehicle according to claim 7, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

16. The driving assistance device for the vehicle according to claim 8, wherein the oncoming-vehicle turning intention determiner is configured to determine whether the oncoming vehicle has the intention to enter the second intersecting road based on one or both of: a vehicle traffic lane in which the oncoming vehicle upon entering the intersection is traveling; and whether a turn signal is blinking.

17. A driving assistance device for a vehicle, comprising circuitry configured to
  recognize traveling environment information related to an outside of the vehicle,
  calculate a predicted traveling path for the vehicle based on a driving condition of the vehicle,
  in a case where an oncoming vehicle is detected based on the traveling environment information, calculate an oncoming-vehicle predicted traveling path for the oncoming-vehicle based on behavior of the oncoming vehicle,
  determine whether the vehicle has an intention to enter a first intersecting road across an oncoming lane by turning in an intersection,
  in a case where the vehicle has the intention to enter the first intersecting road but is unable to enter the first intersecting road along the predicted traveling path, correct the predicted traveling path to a limit traveling path for causing the vehicle to enter the first intersecting road,
  determine whether the oncoming vehicle has an intention to enter a second intersecting road across a traveling lane for the vehicle by turning in the intersection,
  in a case where the oncoming vehicle has the intention to enter the second intersecting road but is unable to enter the second intersecting road along the oncoming-vehicle predicted traveling path, correct the oncoming-vehicle predicted traveling path to an oncoming-vehicle limit traveling path for causing the oncoming vehicle to reach the second intersecting road, and
  set the oncoming vehicle as a control target against which emergency braking is executed in a case where the predicted traveling path up to a preset timing and the oncoming-vehicle predicted traveling path up to the preset timing are expected to overlap each other at least in part.

* * * * *